Jan. 12, 1965   R. J. ROMAN   3,165,593
SOUND DRIVE SYSTEM
Filed June 13, 1960   4 Sheets-Sheet 1
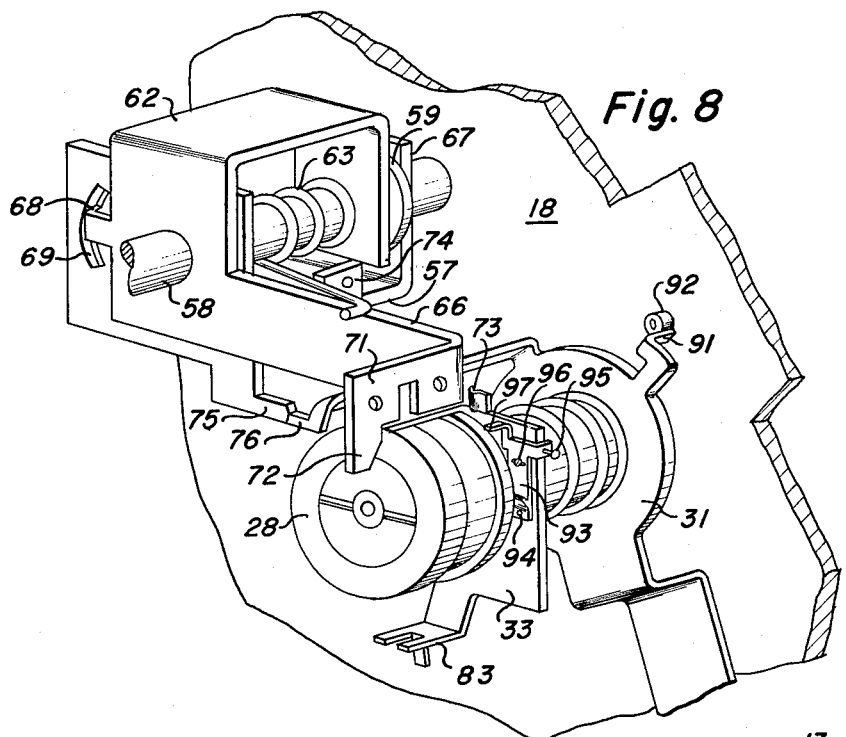
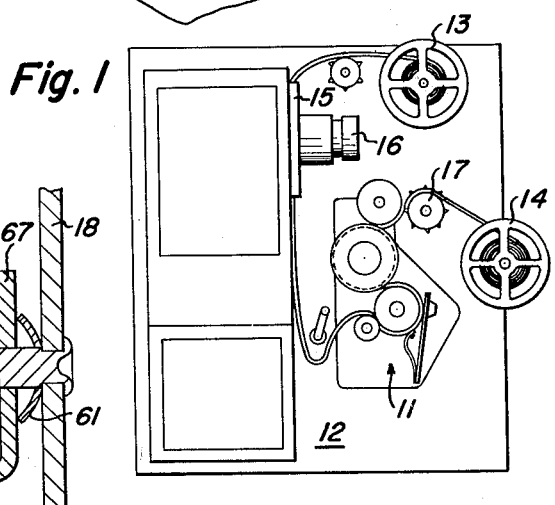
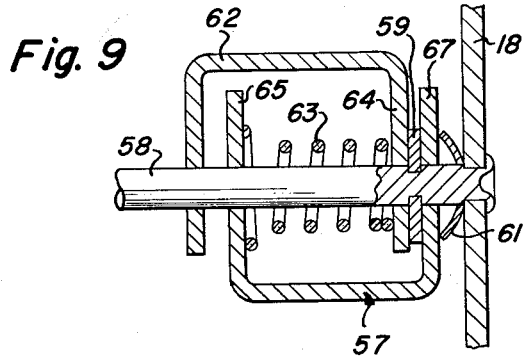
ROBERT J. ROMAN
INVENTOR.
BY R. Frank Smith
Steve W. Grambau
ATTORNEYS

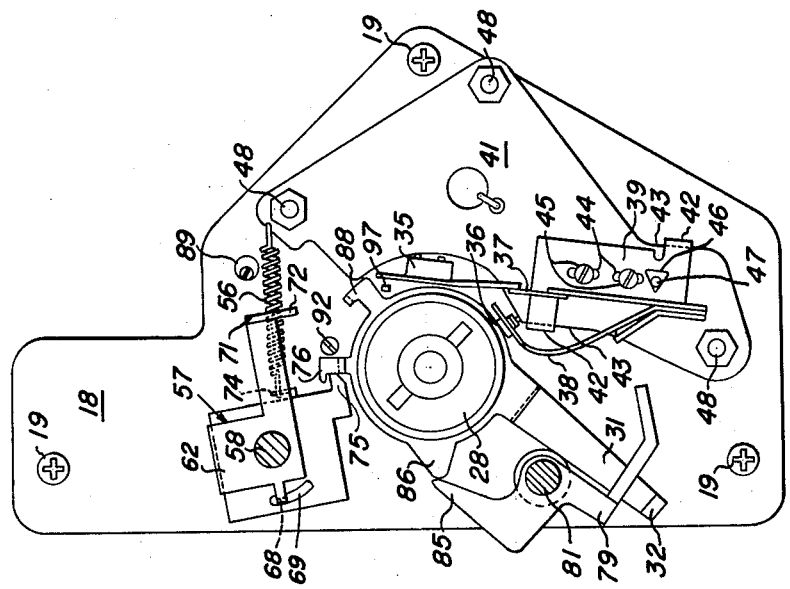

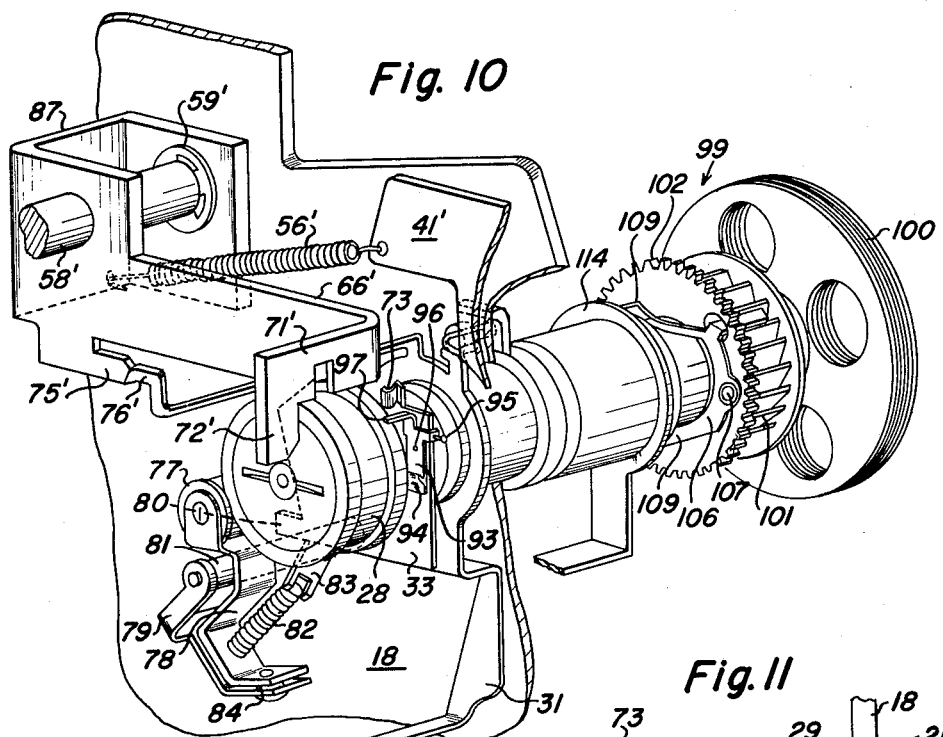
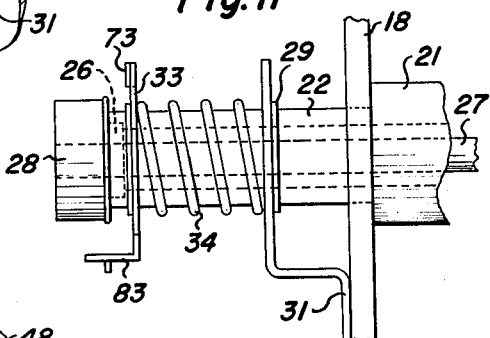
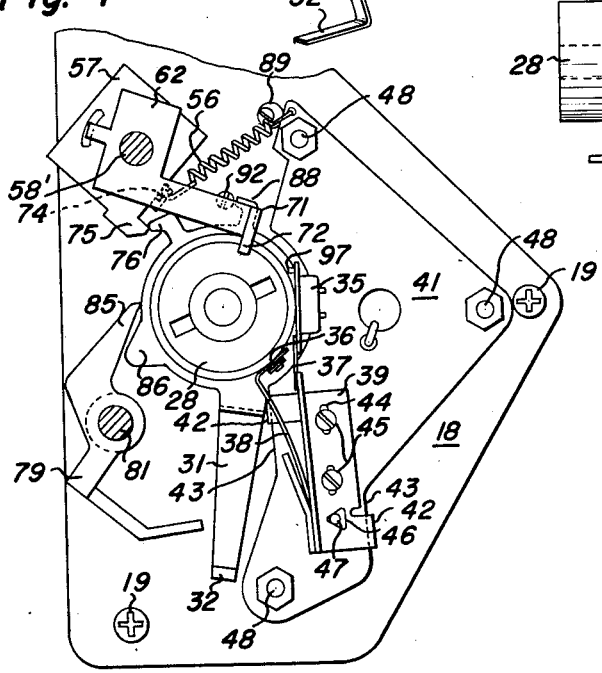
ROBERT J. ROMAN
INVENTOR.
BY
ATTORNEYS

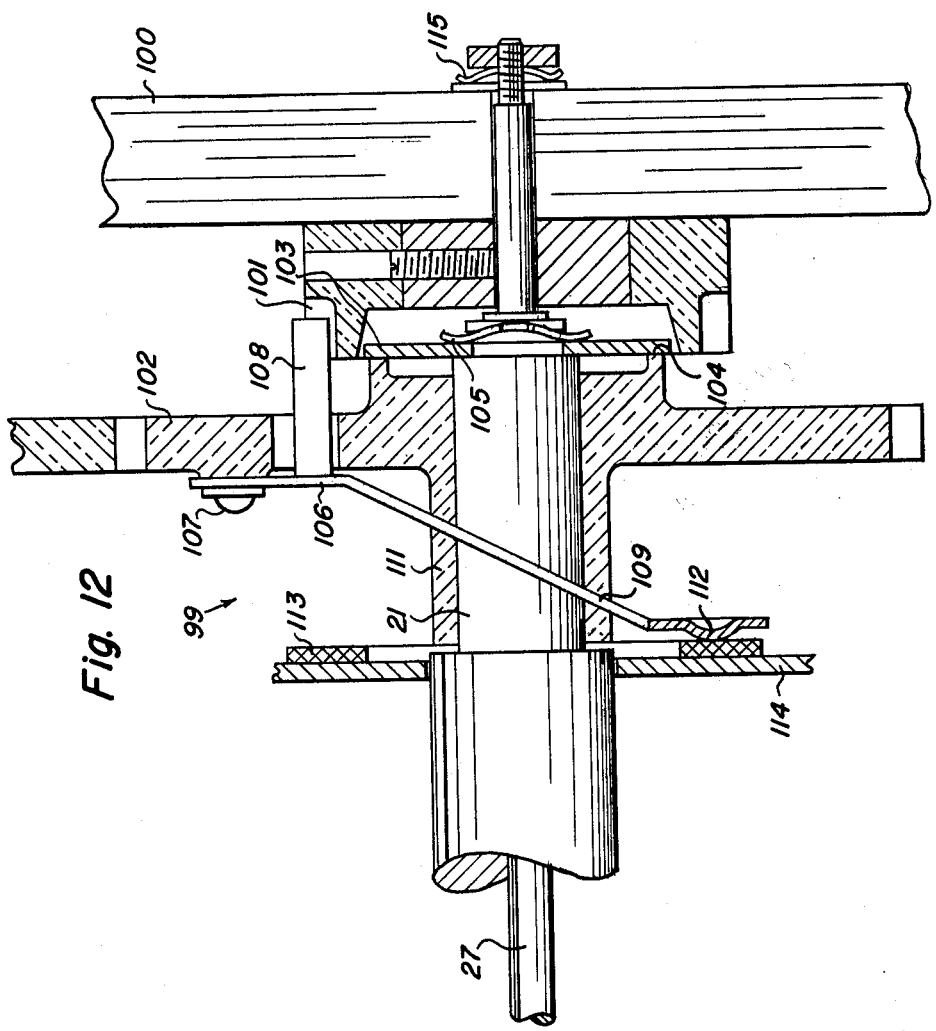

United States Patent Office 3,165,593
Patented Jan. 12, 1965

3,165,593
SOUND DRIVE SYSTEM
Robert J. Roman, Rochester, N.Y., assignor to Eastman
Kodak Company, Rochester, N.Y., a corporation of
New Jersey
Filed June 13, 1960, Ser. No. 35,660
24 Claims. (Cl. 179—100.2)

This invention relates generally to the sound-recording and reproducing art, and more specifically to an improved sound drive system for use in connection with a moving picture projector or the like.

It is generally old in the art to provide a sound drive system for use in connection with a moving picture projector or the like. As is well known, the sound mechanisms record the sound either photographically or magnetically upon a narrow longitudinal area of the film. The film with the sound track is normally supported on a sound drum and a photographic or magnetic recording and reproducing device cooperates with the sound track as the film is drawn past the sound device for either recording sound onto the sound track or reproducing recorded sound therefrom. Since the sound track is extremely narrow and is moving with respect to the recording and reproducing device, it is readily apparent that the tolerances involved must be extremely close in order to obtain satisfactory recording and reproduction of sound. As a consequence, the mechanisms in the past have been relatively complicated in order to achieve the desired precision and high degree of accuracy required. Furthermore, the parts have had to be constructed to close tolerances thus greatly increasing the cost of the device.

Accordingly, one of the primary objects of the present invention is to provide an improved sound drive system for a moving picture projector and the like that is of simple design and construction, thoroughly reliable and efficient in operation, and economical to manufacture.

Another object of this invention is the provision of an improved sound drive system that is extremely rugged in operation.

Another object of this invention is to provide an improved sound drive system in which many of the parts comprise inexpensive and inaccurate stampings which are assembled to produce a highly precise device having a high order or repeatability without loss in accuracy.

Still another object of this invention is to provide an improved sound drive system in which the necessity for constructing the parts to extremely close tolerances has been eliminated.

Another important object of this invention is to provide an improved sound drive system controlled by a single lever and movable between an inoperative or threading position and an operative or sound recording and reproducing position.

Still another object of this invention is to provide an improved sound drive system that is extremely simple to thread.

A more specific object of this invention is to provide improved sound recording and reproducing device in which the heads for recording, reproducing and/or erasing sound on or from a film sound track are carried by a support plate which is pivotably movable on ball bearings toward and away from the sound drum.

Objects and advantages other than those set forth above will be apparent from the following description when read in connection with the accompanying drawing in which:

FIG. 1 is a side levation view of a moving picture projector in which a preferred embodiment of the sound recording and reproducing device of this invention is incorporated;

FIG. 2 is a front side elevation view of the sound drive system with the parts shown in a threading position;

FIG. 3 is a view similar to FIG. 2 showing the sound drive system in an inoperative or silent position;

FIG. 4 is a view similar to FIG. 2 showing the sound drive system in a sound recording and reproducing position;

FIG. 5 is a segmental perspective view showing the spring for constantly urging the head mounting plate against the ball bearings interposed between the plate and bracket;

FIG. 6 is a segmental view taken substantially along the line 6—6 of FIG. 3;

FIG. 7 is a segmental view or section view taken substantially along line 7—7 of FIG. 3;

FIG. 8 is a segmental perspective view showing the film stabilizer bracket in relation to the sound drum and operating lever with the stabilizer bracket greatly enlarged;

FIG. 9 is a vertical section view of the film stabilizer bracket of FIG. 8;

FIG. 10 is a view similar to FIG. 8 showing a modified film stabilizer bracket and including a pressure roller, clutch, and flywheel;

FIG. 11 is a fragmentary side elevation view of a portion of the shaft, tube and sound drum, and FIG. 12 is a side elevation view in section of the clutch shown in FIG. 10.

Referring to FIG. 1 of the drawings, a sound drive system 11 is shown in connection with a moving picture projector 12. The projector 12 comprises a casing having mounted therein film supply and take-up reels 13, 14 respectively, a film gate 15 through which the film is intermittently moved by some suitable pull-down mechanism, not shown, a lens 16 through which the film image is projected, and a drive sprocket 17 for drawing the film from the loop formed by the pull-down mechanism through the sound drive system 11 for winding on take-up reel 14.

The sound drive system 11 includes a mounting plate 18 as best seen in FIG. 2 for detachably mounting mechanism 11 to projector 12 by screws 19. A tubular member 21, as best seen in FIG. 11, has a portion 22 of reduced diameter extending through an opening in plate 18, and tube 21 is secured to plate 18 by L-shaped brackets 23, only one of which is shown in FIG. 5, having one end extending into a peripheral groove 24 formed in tube 21 and the opposite end pulled toward plate 18 by a screw 25 passing through plate 18 and engaging a tapped opening in bracket 23. Sleeve bearings 26, only one of which is shown dotted in FIG. 11, are pressed into the ends of tube 21 for rotatably supporting a shaft 27 having a sound drum 28 secured to one end thereof. The sound drum 28 is of conventional construction having a peripheral groove for preventing the film image from being marred or scratched.

The reduced portion 22 of tube 21 as best seen in FIG. 11 is provided with axially spaced apart annular grooves for receiving retaining rings 29. An operating lever 31 having a handle 32 at one end and an opening at its other end for loosely receiving portion 22 is rotatably movable thereon for controlling movement of a plate 41 and recording-reproducing and erase heads 35, 36 respectively carried thereby into one of three positions, a threading position as seen in FIG. 2 in which heads 35, 36 are withdrawn from sound drum 28 to permit threading film through mechanism 11, an inoperative or silent position as seen in FIG. 3 in which heads 35, 36 are withdrawn from sound drum 28 a sufficient amount so that a film without a sound track may be projected by projector 12 in the normal way without heads 35, 36 bearing on the film, and an operative or recording-reproducing position as seen in FIG. 4 in which heads 35, 36 bear against the sound track of the film. A bracket 33 is loosely mounted on portion 22 and a helical spring 34 encircling portion 22 is interposed between bracket 33 and lever 31 for urging the two against retaining rings 29.

The magnetic recording-reproducing and erase heads 35, 36 respectively as best seen in FIGS. 2-4 are mounted on the ends of a pair of spring members 37, 38 respectively, and the opposite ends of spring members 37, 38 are secured to a reciprocally movable bracket 39. The bracket 39 rests on a plate 41 and is provided with depending lips 42 cooperating with parallel edge portions 43 formed by plate 41 for guiding bracket 39 for reciprocal movement. The bracket 39 is provided with elongated slots 44 through which screws 45 extend into threaded engagement with corresponding tapped openings (not shown) in plate 41. The bracket 39 further has a triangular-shaped opening 46 for receiving an eccentric tool, not shown, adapted to enter an opening 47 in plate 41. For adjusting bracket 39 relative to plate 41, screws 45 are loosened slightly, the eccentric tool inserted in opening 47 and turned to move bracket 39 in one direction or the other along a line A—A as seen in FIG. 3, and then screws 45 tightened to secure bracket 39 to plate 41. The plate 41 is further provided with adjusting studs 48 fitted therethrough and having an enlarged circular head 49 having a conical recess for receiving or nesting a ball bearing 51 which is interposed between plate 18 and head 49, as best seen in FIGS. 6 and 7. By adjusting studs 48, it is possible to vary the distance between plates 18, 41. Once the proper distance has been established, a lock nut 52 secures stud 48 in that position. In the case of two of the studs 48, ball bearings 51 engages the smooth face of plate 18 as seen in FIG. 7 and is slidably movable thereon. In the case of the remaining stud 48, ball bearing 51 nests in a recess 53 formed by plate 18 as seen in FIG. 6 to form a pivot for plate 41. A spring 54 is provided as best seen in FIG. 5 for constantly urging plate 41 toward plate 18 and retaining ball bearings 51 between heads 49 and plate 18. One end of spring 54 passes through an opening in plate 41 and is bent so that the end extends through a smaller opening adjacent thereto to connect spring 54 to plate 41. The other end of spring 54 is secured to a bracket 55 which is loosely mounted on tubular member 21. The bracket 55 is substantially L-shaped and has an opening at one end for loosely receiving tube 21 while the opposite end is adapted to bear against plate 18. Another spring 56 has one end connected to plate 41 and its opposite end connected to an upturned lug 74 of a U-shaped film stabilizing bracket 57 as seen in FIGS. 2 and 3. Spring 56 is normally untensioned and merely acts as a connecting link between plate 41 and bracket 57 for pulling plate 41 in a counterclockwise direction about its pivot bearings 51 toward sound drum 28. Once plate 41 engages an adjustable stop 89, continued clockwise movement of bracket 57 tensions spring 56 which urges plate 41 against stop 89.

One embodiment of the film stabilizing apparatus as best seen in FIGS. 8 and 9 comprises a shaft 58 secured to plate 18 and having a groove therein for receiving a retaining ring 59. The bracket 57 is rotatably mounted on shaft 58, and is biased against retaining ring 59 by a spring washer 61 interposed bracket 57 and plate 18. An inverted U-shaped element 62 is also rotatably mounted on shaft 58 and is biased into engagement with retaining ring 59 by a helical spring 63 encircling shaft 58 and interposed between flanges 64, 65 of element 62 and bracket 57 respectively. One end of spring 63 bears against an arm 66 formed by element 62, and the opposite end thereof is bent back of and in engagement with a flange 67 of member 57 for urging element 62 in a clockwise direction causing a finger 68 formed thereby which extends into a slot 69 of flange 65 to engage one end thereof. The arm 66 has a film guiding portion 71 having a depending lip 72 for preventing lateral movement of the film in one direction on sound drum 28 during forward or reverse projection. Another lip 73 formed by a lever 93 as seen in FIG. 8 prevents lateral movement of the film in the opposite direction. Lever 93 is pivoted to bracket 33 at 94 and is angularly adjustable by screw 95 bearing against one edge of bracket 33, and fixed to bracket 33 by set screw 96. Lever 93 further has a finger 97 forming a stop for reproducing head 35 as best seen in FIG. 2, for preventing the head from bearing against drum 28 with sufficient force during rewinding to scratch, groove or otherwise damage the drum in the event rewinding is attempted while mechanism 11 is in the operative position. The flange 57 has a leg 75 adapted to cooperate with an arm 76 formed by lever 31 for a purpose to be explained hereinafter.

The bracket 57 and element 62 of the film stabilizing apparatus are stamped out of inexpensive stock, but are assembled with springs 61, 63 to provide a highly precise device having a high order of repeatability without loss in accuracy. This is achieved by the action of the springs which constantly urge flanges 64, 67 against ring 59. Spring 63 further constantly urges element 62 in a clockwise direction and bracket 57 in the opposite direction thereby taking up any tolerance or slack existing between the parts.

A pressure roller 77 shown only in FIG. 10 for urging the film into engagement with sound drum 28 is rotatably supported by a substantially inverted S-shaped lever 78 which is urged toward member 79 pivoted on shaft 81 by a spring 82 interposed between lever 78 and an arm 83 formed by bracket 33. The bracket 33 further has an arm 80 shown dotted in FIG. 10 that is urged by spring 82 into engagement with shaft 81 for holding bracket 33 in a substantially fixed position. Ball bearings 84, only one of which is shown, are interposed between lever 79 and member 78, and spring 82 constantly urges lever 79 and member 78 in a clockwise direction causing roller 77 to engage sound drum 28, and a nose 85 formed by member 79 as best seen in FIGS. 2-4 to move into engagement with the periphery of lever 31 and is actuable by a projection 86 formed thereby. This pressure roller mechanism is described in detail in U.S. patent application Serial No. 849,540, now U.S. Patent No. 3,029,992, filed by applicant on October 29, 1959, and accordingly no further reference will be made thereto.

Another embodiment of the film stabilizing apparatus is shown in FIG. 10. In this view, all parts identical to parts previously mentioned will be designated by the same numerals primed. In this figure, the film stabilizing apparatus comprises a single pivotal member 87 mounted on shaft 58' and retained thereon by retaining ring 59'. The spring 56' has one end connected to member 87 and the other end to plate 41' for urging member 87 in a counterclockwise direction at all times with respect to shaft 58' thereby removing any slack or tolerance existing between the parts resulting from member 87 being formed as a stamping. The member 87 further has a leg 75' and an arm 66' provided with a film guiding portion 71'. With this film stabilizing apparatus, the parts of the mechanism are properly oriented so that arm 66' never engages bracket 33, since lip 72' is made sufficiently long to function effectively as a guide for the film in both positions.

In sound projectors of the type described in which the sound recording-reproducing head 35 is movable toward and away from sound drum 28, it is necessary in reverse operation of the projector to drive sound drum in reverse in order to prevent loss of the lower film loop. This is accomplished by a clutch mechanism 99 of novel construction as best seen in FIGS. 10 and 12 which in forward operation of the sound projector is completely isolated from sound drum 28, shaft 27, and a flywheel 100 and ratchet wheel 101 which are secured to shaft 27. The clutch mechanism 99 comprises a reverse drive gear 102 rotatably mounted on tube 21 and driven by any suitable drive means, not shown. The drive means drives sprocket 17 for transporting the film through projector 12 in forward and reverse direction as is well known, and further drives gear 102 in corresponding forward and reverse directions. The gear 102 is retained on tube 21 by washer 103 which is urged against shoulder 104 by a spring retaining ring 105. Drive gear 102 further carries a pivotal member 106 pivoted about screw 107. Member 106 has a laterally extending pawl 108 loosely extending through an opening in gear 102 and adapted to cooperate with ratchet wheel 101. Member 106 further has forked spring arms 109 extending around hub 111 of gear 102, each arm 109 having a projection 112 engaging a cork friction washer 113 carried by a stationary projector frame member 114. Flywheel 100 is secured to shaft 27 by a friction clutch 115 which allows flywheel 100 to slip during starting, thus absorbing shock.

In forward operation of the projector, gear 102 is rotated and spring arms 109 and friction washer 113 cause member 106 to pivot in a direction withdrawing pawl 108 from engagement with ratchet wheel 101. Consequently, gear 102 and member 106 rotate around stationary tube 21 which completely isolates the gear and member from sound drum 28, shaft 27 and ratchet wheel 101, thereby preventing the introduction of flutter or wow into the sound system. In reverse operation, member 106 is pivoted in the opposite direction by virtue of arms 109 and washer 113 causing pawl 108 to drivingly engage ratchet wheel 101 for driving wheel 101, shaft 27 and sound drum 28 in the reverse direction.

In the operation of this invention, the operator initially moves lever 31 by handle 32 until lever 31 engages shaft 81 placing the sound drive system in its threading position as seen in FIG. 2 so that the operator may easily and quickly thread the film through the mechanism. As lever 31 is being moved into the threading position, a projection 88 formed by lever 31 engages an edge of plate 41 and urges plate 41 in a clockwise direction withdrawing heads 35, 36 from sound drum 28. The untensioned spring 56 functions as a connecting link pulling member 57 in a counterclockwise direction as arm 76 is withdrawn from leg 75, and element 62 is moved therealong by virtue of finger 68 and slot 69 withdrawing film guiding portion 71, 72 from sound drum 28. Also, projection 86 engages nose 85 and urges member 79 and lever 78 in a counterclockwse direction against the bias of spring 82 withdrawing pressure roller 77 from sound drum 28. The nose 85 has a flat spot which cooperates with the tip of projection 86 under the influence of spring 82 for releasably locking the mechanism in the threading position. After projector 12 has been threaded, the operator if he wishes to make a recording, moves lever 31 counterclockwise moving sound drive system 11 into the operative or sound recording and reproducing position as seen in FIG. 4. In this position, projection 88 engages a stop 92. As lever 31 is moved into the operative position, arm 76 moves leg 75 and member 57 clockwise causing untensioned spring 56 to pull plate 41 in a counterclockwise direction up against stop 89 as projection 88 is withdrawn from the edge of plate 41 moving heads 35, 36 into engagement with the sound track of the film. Element 62 is moved along with member 57 by virtue of spring 63 until arm 66 engages bracket 33 which forms a stop for element 62. Member 57 is moved further relative to element 62 and plate 41 as projection 88 is moved into engagement with stop 92, tensioning springs 63 and 56. Leg 75 is provided with a flat spot which cooperates with the tip of arm 76 under the influence of the spring force of springs 63 and 56 to releasably hold the device in the sound recording position. Also, in the sound recording position, tensioned spring 56 urges plate 41 against adjustable stop 89, and projection 86 slips off of nose 85 allowing spring 82 to urge member 79, lever 78 and pressure roller 77 in a clockwise direction into engagement with the film and sound drum 28.

In the event the operator desires to run a film strip through the projector that does not have a sound track, he merely moves lever 31 into the silent position as seen in FIG. 3. The device is held in this position by the combined actions of springs 54 and 63. Any attempt to move lever 31 further clockwise from the silent position is resisted by the frictioned force of plate 41 against plate 18 caused by spring 54, and since arm 66 in this position still engages bracket 33, any attempt to move lever 31 in the opposite direction is resisted by spring 63. In this position, both heads 35, 36 are held out of engagement with the film strip on sound drum 28, but pressure roller 77 still urges the film into engagement with sound drum 28.

The invention has been described in detail with particular reference to preferred embodiment thereof, but it will be understood that variations and modifications can be effected within the spirit and scope of the invention as described hereinabove and as defined in the appended claims.

I claim:

1. In a sound drive system for a projector or the like, the combination comprising: a rotatable sound drum for supporting a film having a sound track; a support; sound recording-reproducing means including a plate pivoted on a first ball interposed between said plate and said support and movable between a normal first position in which said sound recording reproducing means is in engagement with said sound track, and a second position in which said sound recording-reproducing means is out of engagement with said sound track; and actuating means for moving said sound-reproducing means between said first and second positions.

2. The invention according to claim 1, and further including a plurality of second balls interposed between said plate and said support and spaced from said first ball.

3. The invention according to claim 1, and further including a spring interconnecting said plate and said support for urging said plate toward said support.

4. The invention according to claim 1, and further including a first spring interconnecting said plate and said support for urging said plate toward said support, and a sound recording-reproducing head mounted on said plate; and said actuating means comprises a pivotal lever having first and second projections, and connecting means interconnecting said plate and said lever and cooperating with said projections whereby movement of said lever in one direction causes one of said first and second projections to move said plate from said normal first position to said second position, and movement of said lever in the opposite direction causes said remaining projection to actuate said connecting means which moves said plate from said second position into said first position.

5. The invention according to claim 4 wherein said connecting means comprises a pivotal bracket and a second spring connecting said plate to said bracket, said bracket further adapted upon movement of said lever in said opposite direction to be pivoted by said remaining projection for moving said plate into said first position and tensioning said second spring after said plate is in said first position for positively holding said plate in said first position.

6. The invention according to claim 1 wherein said actuating means comprises a pivotal lever having first and second projections, and connecting means interconnecting said lever and said sound recording-reproducing means and cooperating with said projections whereby movement of said lever in one direction causes one of said first and second projections to move said plate from said normal first position to said second position, and movement of said lever in the opposite direction causes said remaining projection to actuate said connecting means which moves said plate from said second position into said first position.

7. The invention according to claim 6 wherein said connecting means comprises a pivotal bracket and a spring connecting said plate to said bracket, said bracket further adapted upon movement of said lever in said opposite direction to be pivoted by said remaining projection for moving said plate into said first position, and then tensioning said spring after said plate is in said first position for positively holding said plate in said first position.

8. In a sound drive system for a projector or the like, the combination comprising: a rotatable sound drum for supporting a film having a sound track; sound recording-reproducing means movable between an inoperative position and an operative position in which said sound recording-reproducing means is in engagement with said sound track; pressure roller means movable between an inoperative position and an operative position in which said film is urged into engagement with said sound drum; film stabilizing means movable between an inoperative position and an operative position in which said film is prevented from laterally moving off of said drum; and actuating means including a common control lever for moving said three aforementioned means to their respective operative positions when said lever is in a first position, and moving said three aforementioned means to their respective inoperative positions when said lever is in a second position.

9. The invention according to claim 8 wherein said sound recording-reproducing means is pivotally movable between said operative and inoperative positions.

10. The invention according to claim 8 and further including a support, and a pivotal plate mounted on said support and carrying said sound recording-reproducing head.

11. The invention according to claim 10 wherein the pivot for said plate comprises a ball interposed between said plate and said support.

12. The invention according to claim 10 wherein a plurality of balls are interposed between said plate and said support, and one of said balls forms a pivot for said plate.

13. The invention according to claim 12 wherein a spring urges said plate toward said support.

14. The invention according to claim 8 including a support, and wherein said sound recording-reproducing means comprises a pivotal plate, a plurality of balls interposed between said plate and said support with one of said balls forming a pivot for said plate, a first spring for urging said plate toward said support, and a sound recording-reproducing head mounted on said plate; and said control lever is pivotal and has projections cooperable with said recording-reproducing means, pressure roller means and stabilizing means whereby movement of said lever in one direction urges said three aforementioned means into their inoperative positions, and movement of said lever in another direction initiates return of said three aforementioned means to their operative positions.

15. The invention according to claim 14 wherein a second spring urges said pressure roller means into its operative position, and connecting means interconnects said recording-reproducing means and said film stabilizing means whereby movement of said recording-reproducing means into its inoperative position by said lever pulls said film stabilizing means into its inoperative position.

16. The invention according to claim 15 wherein said stabilizing means comprises a pivotal bracket, and said connecting means comprises a third spring connecting said plate to said bracket, said bracket further adapted upon movement of said lever in said opposite direction to be pivoted by one of said projections for pulling said recording-reproducing means into its operative position and then tensioning said third spring after said recording-reproducing means is in said first position for positively holding said recording-reproducing means in said first position.

17. The invention according to claim 1 including a fixed tube, and a shaft disposed within said tube and rotatably supported thereby, said sound drum being mounted on said shaft and rotatable therewith.

18. In a sound drive system for a projector or the like having drive means for transporting a film having a sound track in a forward direction for recording-reproducing and in a reverse direction for wind up, the combination comprising: a fixed member; a rotatable sound drum carried by said fixed member to support said film and to be rotated in a counterclockwise direction by forward movement of the film; a drive member rotatably mounted on said fixed member and driven by said drive means in a forward direction when said film is transported in a forward direction, and in a reverse direction when said film is transported in a reverse direction; and means including a one-way clutch interposed between said drive member and said drum to drive said sound drum in a clockwise direction when said film and said drive member are transported and rotated respectively in their reverse directions, and to free said drum from said drive member when said film and said member are transported and rotated respectively in their forward directions whereby sound vibrations produced by said drive member and last mentioned means are isolated from said sound drum during movement of the film in a forward direction.

19. The invention according to claim 18 wherein said one-way clutch comprises a ratchet wheel rotatable with the sound drum; and a pawl mechanism carried by said drive member and engageable with said ratchet wheel.

20. The invention according to claim 19, including a fixed flange, and wherein said drive member comprises a gear, and said pawl mechanism comprises a lever pivotally mounted on said gear and having a drive pawl adapted to engage said ratchet wheel, and a flexible arm in frictional engagement with said fixed flange for pivoting said lever and moving said drive pawl between ratchet wheel engaged and disengaged positions upon rotation of said gear in reverse and forward directions respectively.

21. The invention according to claim 19, including a fixed flange, and wherein said drive member comprises a gear, and said pawl mechanism comprises a lever pivotally mounted on said gear and having a drive pawl laterally extending therefrom through an opening in said gear for engagement with said ratchet wheel, and a pair of spaced apart flexible arms encircling the hub of said gear and having end portions in frictional engagement with said fixed flange for pivoting said lever and moving said drive pawl between ratchet wheel engaged and disengaged positions upon rotation of said gear in reverse and forward directions respectively.

22. The invention according to claim 4 and further including a stop engageable by said plate in said normal first position, and wherein said connecting means comprises a pivotal bracket and a second spring connecting said plate to said bracket, said bracket further adapted to be pivoted by said remaining projection for pulling said plate into engagement with said stop, and tensioning said second spring after said plate is in engagement with said stop for positively holding said plate in said first position.

23. The invention according to claim 6 and further including a stop engageable by said plate in said normal first position, and wherein said connecting means comprises a pivotal bracket and a spring connecting said plate to said bracket, said bracket further adapted upon movement of said lever in said opposite direction to be pivoted by said remaining projection for pulling said plate into engagement with said stop, and then tensioning said spring after said plate is in engagement with said stop for positively holding said plate in said first position.

24. The invention according to claim 15 and further including a stop for said recording-reproducing means in its operative position, and wherein said stabilizing means comprises a pivotal bracket, and said connecting means comprises a third spring connecting said plate to said bracket, said bracket further adapted upon movement of said lever in said opposite direction to be pivoted by one of said projections for pulling said recording-reproducing means into its operative position in engagement with said stop, and then tensioning said third spring while said recording-reproducing means is in engagement with said stop for positively holding said recording-reproducing means in said first position.

References Cited in the file of this patent

UNITED STATES PATENTS

| | | |
|---|---|---|
| 2,688,389 | Wittel | Sept. 7, 1954 |
| 3,016,310 | Andrew | Jan. 9, 1962 |

FOREIGN PATENTS

| | | |
|---|---|---|
| 537,829 | Italy | Jan. 9, 1956 |